(12) United States Patent
Kitazoe et al.

(10) Patent No.: US 8,311,512 B2
(45) Date of Patent: Nov. 13, 2012

(54) SECURITY ACTIVATION IN WIRELESS COMMUNICATIONS NETWORKS

(75) Inventors: Masato Kitazoe, Tokyo (JP); Sai Yiu Duncan Ho, San Diego, CA (US); Francesco Grilli, La Jolla, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1179 days.

(21) Appl. No.: 12/142,105

(22) Filed: Jun. 19, 2008

(65) Prior Publication Data

US 2008/0318546 A1    Dec. 25, 2008

Related U.S. Application Data

(60) Provisional application No. 60/945,535, filed on Jun. 21, 2007.

(51) Int. Cl.
*H04M 1/66* (2006.01)
*H04M 1/68* (2006.01)
*H04M 3/16* (2006.01)

(52) U.S. Cl. .................................................. 455/410
(58) Field of Classification Search .................. 455/410
See application file for complete search history.

(56) References Cited

U.S. PATENT DOCUMENTS

| 2002/0009199 A1* | 1/2002 | Ala-Laurila et al. | 380/247 |
| 2002/0197979 A1* | 12/2002 | Vanderveen | 455/410 |
| 2003/0035546 A1* | 2/2003 | Jiang et al. | 380/277 |
| 2003/0087647 A1* | 5/2003 | Hurst | 455/456 |
| 2004/0162055 A1* | 8/2004 | Wu | 455/410 |
| 2004/0203783 A1* | 10/2004 | Wu et al. | 455/436 |
| 2004/0228491 A1* | 11/2004 | Wu | 380/272 |
| 2006/0121883 A1* | 6/2006 | Faccin | 455/411 |
| 2007/0064647 A1* | 3/2007 | Prasad | 370/331 |
| 2007/0224993 A1* | 9/2007 | Forsberg | 455/436 |
| 2008/0039096 A1* | 2/2008 | Forsberg | 455/438 |
| 2009/0164788 A1* | 6/2009 | Cho et al. | 713/175 |

FOREIGN PATENT DOCUMENTS

WO    WO2005027560    3/2005

OTHER PUBLICATIONS

"LS on Key Change in LTE Active Mode" 3GPP TSG SA WG3 Security, SA3#47, S3-070475, Tallinn, Estonia, May 22-25, 2007.
ETSI Standards: "Universal Mobile Telecommunications System (UMTS); 3G security, Security architecture—3GPP TS 33.102 v7.1.0 release 7; ETSI TS 133 102" ETSI Standards vol. 3-SA3, V7.1.0, Dec. 1, 2006, ISSN: 0000-0001, Sect. 6.8, XP014040243.

(Continued)

*Primary Examiner* — Nathan Mitchell
(74) *Attorney, Agent, or Firm* — Liem T. Do

(57) ABSTRACT

Systems and methodologies are described that facilitate security activation within a specified security activation time. Thus, where handover occurs or is initiated within the activation time, security keys can be activated in such a way as to not be substantially affected by the handover. In one example, a handover time can be set to occur beyond the security activation time to ensure the security activation happens first. Additionally, a handover command can comprise security keys that can be activated upon handover in another example. Moreover, in non-real-time contexts, dummy packets can be transmitted to allow timer operability with packet sequence numbering, or security activation times can be substantially ignored by utilizing a verification process.

28 Claims, 16 Drawing Sheets

OTHER PUBLICATIONS

ETSI Standards: "Universal Mobile Telecommunications System (UMTS); Radio resource control (RRC) protocol specification (3GPP TS 25.331 v6.9.0 Release 6); ETSI TS 125 331, section 8.1.12," ETSI Standards vol. 3-R2, No. V6.9.0, Mar. 1, 2006, pp. 99-112, ISSN: 0000-0001, section 8.1.12.3, fig 8.1.12, XP002530713.

International Search Report/Written Opinion—PCT/US08/067747—International Search Authority EPO—Jun. 18, 2009.

\* cited by examiner

SECURITY ACTIVATION IN WIRELESS COMMUNICATIONS NETWORKS

CROSS-REFERENCE TO RELATED APPLICATIONS

This application claims the benefit of U.S. Provisional Patent application Ser. No. 60/945,535 entitled "SECURITY KEY CHANGE IN LTE_ACTIVE STATE" which was filed Jun. 21, 2007. The entirety of the aforementioned application is herein incorporated by reference.

BACKGROUND

I. Field

The following description relates generally to wireless communications, and more particularly to security activation in wireless communications networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

The base stations can facilitate communication between the mobile devices and core wireless network components, such as authentication, authorization, and accounting (AAA) servers, one or more gateways, or any service providing components. For example, the core network components can be utilized to authenticate mobile devices for communicating with other devices or components of the wireless network. The authentication can utilize one or more security keys that can be transmitted from core network components to the mobile devices. The mobile devices can apply the keys to subsequent communications to ensure authenticity for the core network components. New security keys can be generated for a given time period, in one example. Additionally, the authentication can require that newly generated keys be utilized by the mobile devices within a specified time period.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating security key activation for real-time and non-real-time wireless network utilization where the activation requires newly generated key usage within a given time period. Additionally, security key activation is provided for required activation times in the case of handing over device communications between access points. For example, handover activation timers can be utilized to ensure security activation completes before handover. In another example, new security keys can be utilized upon handing over communications. Moreover, in non-real-time utilization, security activation timers can be ignored or taken into account by transmitting dummy protocol data units to maintain substantially accurate packet sequence numbers, where the packet sequence numbers are utilized to track the security activation timer, for example.

According to related aspects, a method for activating security keys in wireless communications networks is provided. The method comprises receiving first security keys from a core network component associated with a security activation timer by which the security keys are to be applied. The method can further include applying the first security keys within the security activation timer and handing over communications from a source access point to a target access point within the security activation timer after applying the first security keys Another aspect relates to a wireless communications apparatus. The wireless communications apparatus can include at least one processor configured to apply a first set of security keys determined from a source access point having a specified security activation time and complete handover of communications from the source access point to a target access point within the security activation time. The wireless communications apparatus can also include a memory coupled to the at least one processor.

Yet another aspect relates to a wireless communications apparatus that activates security keys in wireless communications networks. The wireless communications apparatus can comprise means for applying first security keys within a specified security activation time. The wireless communications apparatus can further include means for initiating: communications handover from a source access point to a target access point within the specified security activation time.

Still another aspect relates to a computer program product, which can have a computer-readable medium including code for causing at least one computer to receive first security keys from a core network component associated with a security activation time by which the security keys are to be applied. The computer-readable medium can also comprise code for causing the at least one computer to apply the first security keys within the security activation time. Moreover, the computer-readable medium can comprise code for causing the at least one computer to handover communications from a source access point to a target access point within the security activation time after applying the first security keys.

According to a further aspect, a method for activating security in non-real-time wireless communication network configurations is provided. The method can include receiving a security mode command message from an access point and resuming relevant radio bearers for transmitting a security mode complete message. The method can further comprise suspending the relevant radio bearers after transmitting the security mode complete message.

Another aspect relates to a wireless communications apparatus. The wireless communications apparatus can include at least one processor configured to resume relevant radio bearers for transmitting a security mode complete message. The at least one processor can be further configured to transmit the security mode complete message to a source access point and suspend the relevant radio bearers after transmitting the security mode complete message. The wireless communications apparatus can also include a memory coupled to the at least one processor.

Yet another aspect relates to a wireless communications apparatus for activating security in non-real-time wireless communication network configurations. The wireless communications apparatus can comprise means for receiving a security mode command message from an access point and means for resuming suspended relevant radio bearers for transmitting a security mode complete message. The wireless communications apparatus can further include means for suspending the relevant radio bearers after transmitting the security mode complete message.

Still another aspect relates to a computer program product, which can have a computer-readable medium including code for causing at least one computer to receive a security mode command message from an access point. Moreover, the computer-readable medium can comprise code for causing the at least one computer to resume suspended relevant radio bearers for transmitting a security mode complete message and code for causing the at least one computer to suspend the relevant radio bearers after transmitting the security mode complete message.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
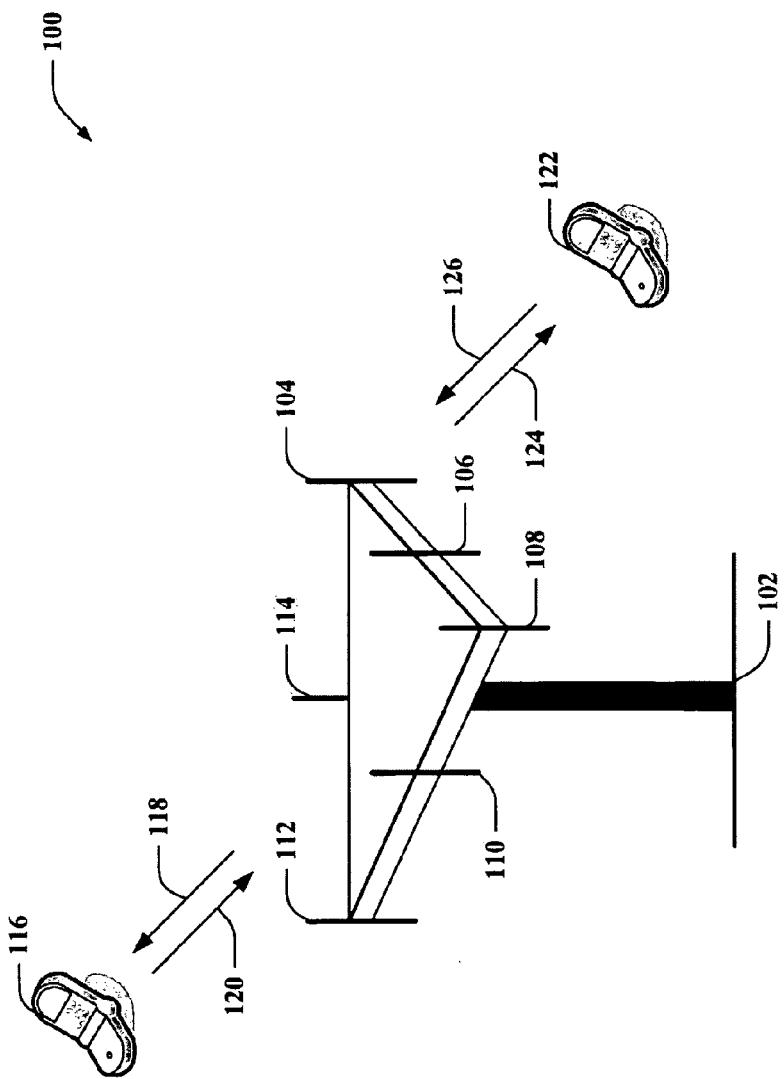
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without, these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the unlink. UTRA. E-UTRA. UMTS. LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. Moreover, the base station 102 can provide the mobile devices 116 and/or 122 with access to the wireless network via core network components. For example, the base station 102 can facilitate communications between the mobile devices 116 and/or 122 and the base station 102 to provide services, such as authentication and/or authorization. In one example, a core network authorization, authentication, and accounting (AAA) server (not shown), or other core network component, can authenticate the mobile devices 116 and/or 122 via base station 102 to utilize the wireless network. To this end, the AAA server/core network component can generate security keys in an authentication and key agreement (AKA) for the mobile devices 116/122 to utilize in subsequent communications and transmit the keys to the mobile devices 116/122 via the base station 102. According to an example, the AAA server, or a network policy for example, can set a security activation time by which the security keys must be utilized by the mobile devices 116/122 (e.g., 10 minutes). In addition, the security keys can have a specified life or expiration time (e.g., 5 hours).

As described herein, the mobile devices 116 and/or 122, a target base station, and a source base station can take the keys into use within the security activation time in a real-time context. In one example, where the security activation occurs during a handover in communication of a mobile device 116 and/or 122 to/from base station 102, an activation timer can be utilized for the handover such that the security activation time can be; reached before the handover activation time. In this regard, the handover can occur after the security activation. According to another example, security key change can occur upon handover such that new keys can be transmitted in the handover command. For non-real-time configurations, security keys can be assumed taken, into use and/or dummy protocol data units (PDU) can be transmitted to maintain packet sequence numbers as further described infra.

Figure 2:
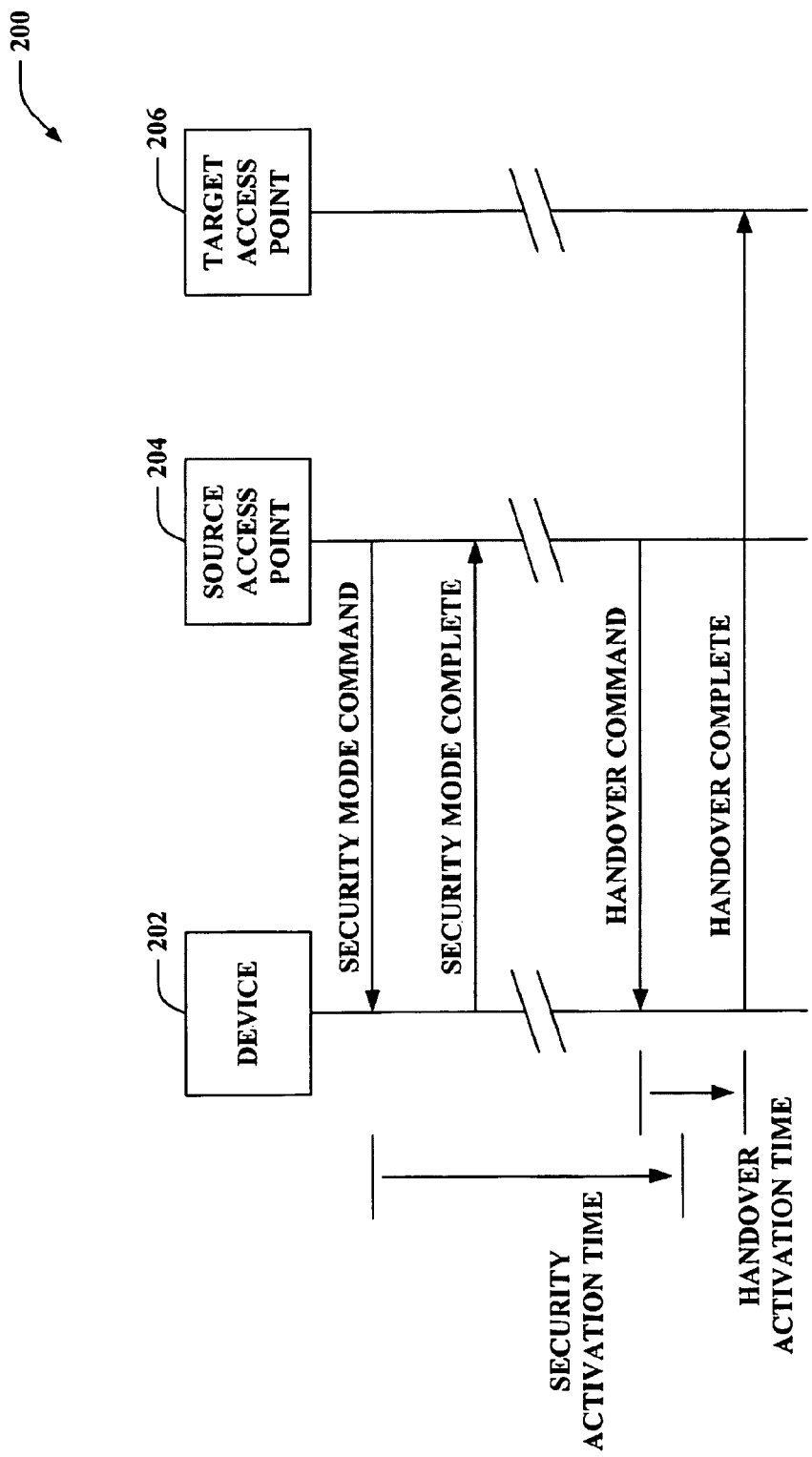
FIG. 2 is an illustration of an example wireless communication system that applies security keys for authenticating subsequent communications.

Turning to FIG. 2, illustrated is a wireless communication system 200 that facilitates handling security activation for real-time and/or non-real-time services. The wireless communications system 200 can comprise a device 202 that communicates with a source access point 204 and can handover communication to a target access point 206. For example, the access points 204/206 can be base stations, such as eNBs and the like, hotspots, or substantially any device that can provide wireless network services to wireless devices. The device 202 can be, for example, cellular phones, smart phones, laptops, handheld communication devices, handheld computing devices, satellite radios, global positioning systems, PDAs, and/or any other suitable device for communicating over wireless communication system 200.

In one example, the device 202 can communicate with the source access point 204 to receive wireless communications services, including communicating with one or more core network components. To this end, the core network can authenticate the device 202 via communication through the source access point 204. This can include transferring security keys and/or transferring parameters required to derive security keys to the device 202 in an AKA procedure where the device 202 can utilize the keys to authenticate subsequent communications with the source access point 204. As described, the security keys can have a security activation time by which the keys must be taken into use; additionally, the keys can have an expiration time. In real-time services where the device 202 is stationary, the security timing is of small consequence. However, where the device 202 is mobile and being handed over between access points, the security activation time can be handled in a few different ways. To this end, the wireless communication system 200 can ensure keys are taken into use, and the correct keys are utilized in communication, during handover.

According to an example, the wireless communication system 200 can utilize an activation timer for communications handover in real-time services. This can be possible as a device utilizing real-time services can have substantially reliable packet sequence numbering, which can be utilized to effectuate the timer. In this example, the device 202 and access points 204/206 can ensure the security activation time is reached before the handover activation time by setting the handover activation time beyond the security activation time. In the real-time services context, the security activation time can be set near in time, and thus the handover activation time can be set after that; it is to be appreciated that the handover activation time is not substantially affected as the security activation time can be small. According to this example, the device 202 can receive a security mode command (SMC) from the source access point 204, which can comprise the new security keys or parameters required to derive new security keys. The device 202 can transmit a security mode complete within the security activation time. During the security activation time, a handover command can be transmitted from the source access point 204 to the device 202 regarding handing over communications to the target access point 206. The handover activation timer can be set after the security activation timer such that security mode complete is transmitted before handing over communications to the target access point 206 via the handover complete message.

Figure 3:
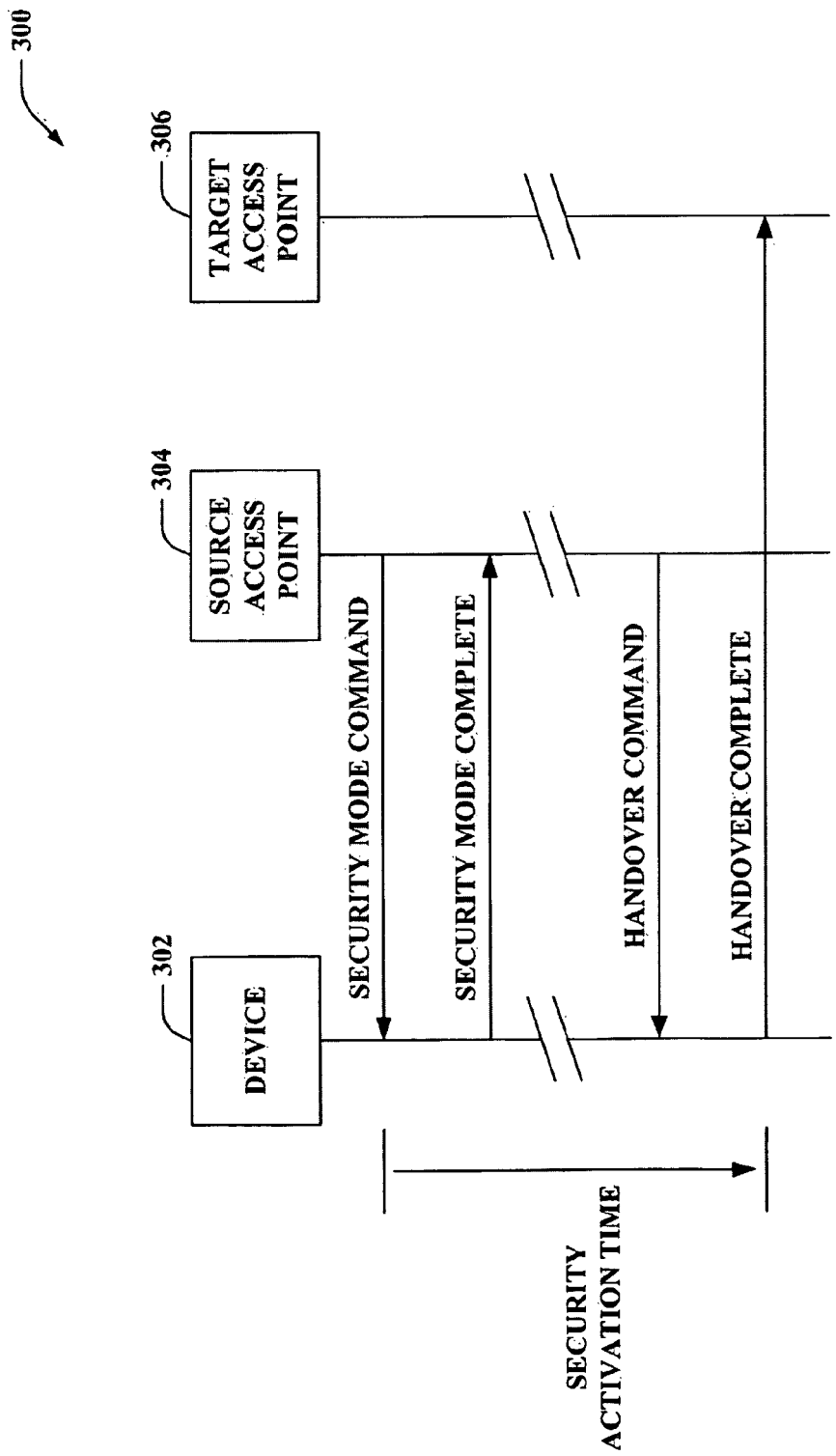
FIG. 3 is an illustration of an example wireless communication system that applies security keys following handover.

Now referring to FIG. 3, illustrated is a wireless communication system 300 that facilitates handling security activation for real-time and/or non-real-time services. The wireless communications system 300 can comprise a device 302 that communicates with a source access point 304 and can handover communication to a target access point 306 as described previously. According to this example, new security keys can be applied at the time of handover. For instance, an SMC can be transmitted from the source access point 304 to the device 302 comprising new security keys or parameters required to derive new security keys. Additionally, a handover command can be sent from the source access point 304 to the device 302 to facilitate handing over communications to the target access point 306. In one example, the handover command can comprise the second new security key set or parameters required to derive the second new security key set for utilization in communicating with the target access point 306. In this regard, the wireless network and the device can immediately apply the previously derived first security key sets in the wireless connection at the source access point. The device 302 can associate the second new key set with target access point 306 communication (such as, for example, transmitting random access preambles before handover complete) and the first key set with the source access point 304. Once handover is complete, the first key set need not be retained as device 302 communication has been handed over to the target access point 306. If handover fails, for example, the device 302 can apply the first key set to continuing communicating with the source access point 304. Moreover, if the second new security key set or parameters required to derive the second new security key set is not sent in the handover command, the device 302 can utilize the first key set from the SMC to communicate with the target access point 306 during and following handover.

According to yet another example, the new security keys from SMC can be cancelled at the time of handover. For instance, an SMC can be transmitted from the source access point 304 to the device 302 comprising new security keys or parameters required to derive new security keys. Additionally, a handover command can be sent from the source access point 304 to the device 302 to facilitate handing over communications to the target access point 306. In one example, the handover command can comprise the second new security key set or parameters required to derive the second new security key set for utilization in communicating with the target access point 306. In this regard, the wireless network and the device can cancel the previously derived first security key sets in favor of the new keys (e.g., where the security activation time has not been reached, where there is uncertainty as to whether the security activation time has been reached, etc.). The device 302 can associate the second new key set with target access point 306 communication (such as, for example, transmitting random access preambles before handover complete) and the old keys with the source access point 304. Once handover is complete, the old keys need not be retained as device 302 communication has been handed over to the target access point 306. If handover fails, for example, the device 302 can apply the old keys to continuing communicating with the source access point 304.

Figure 4:
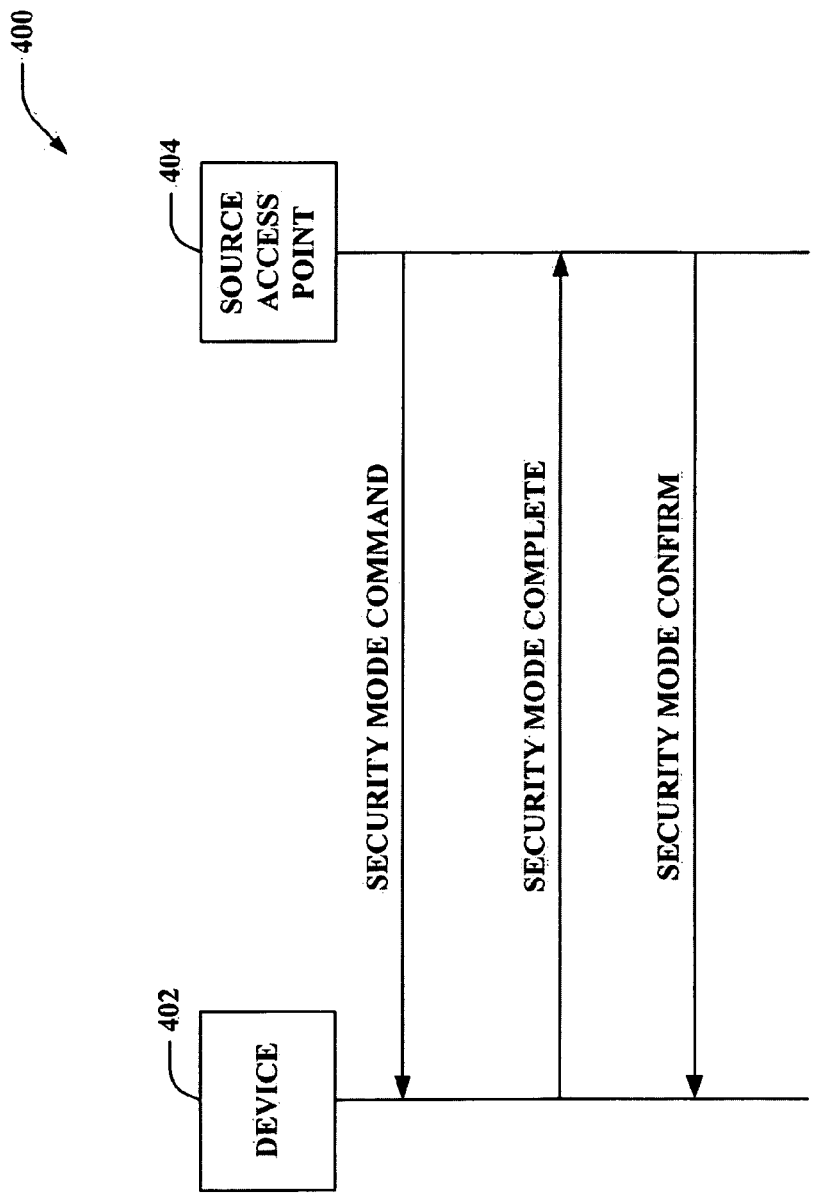
FIG. 4 is an illustration of an example wireless communication system that applies security keys depending on a confirmed security mode.

Turning now to FIG. 4, illustrated is a wireless communication system 400 that facilitates handling security activation for non-real-time services. The wireless communications system 400 can comprise a device 402 that communicates with a source access point 404, which can transmit security keys and/or parameters to receive the security keys. In this configuration, handover to a target access point can be not as likely to occur as with real-time services since the communication is not as consistent as real-time. Moreover, in non-real-time environments, timers based on packet sequence numbering are not as prevalent since the packet sequencing is less predictable. In this regard, the device 402 can receive the SMC from source access point 404 and transmit the security mode complete message to the source access point 404 to indicate adoption of the new security keys. Subsequently, the device 402 can suspend the radio bearers until it receives a security mode confirmation from the source access point 404 (e.g., layer 2 acknowledgement (L2-ACK), 3-way handshake, etc.) to ensure the security key activation occurred within the activation time period.

Figure 5:
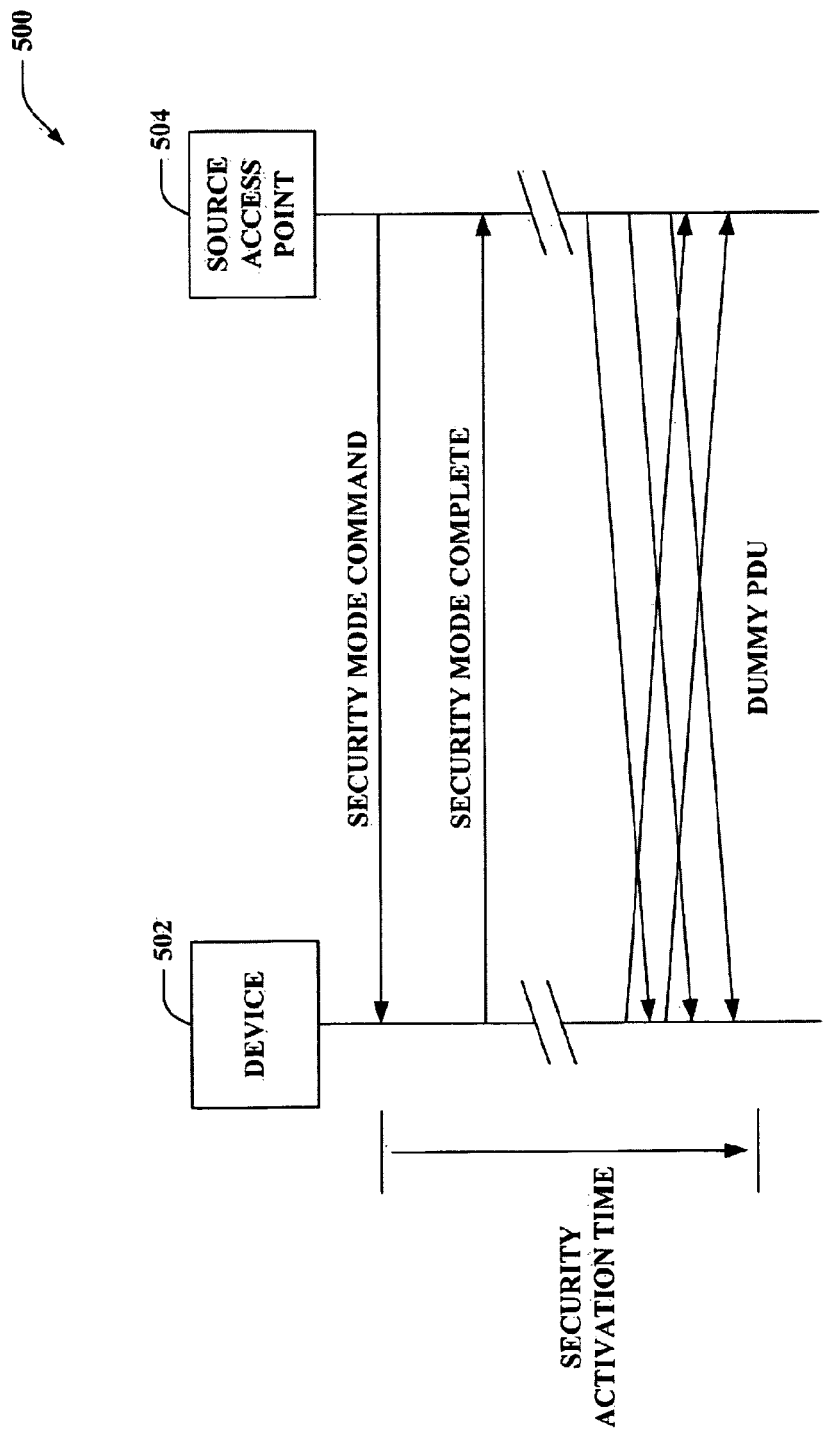
FIG. 5 is an illustration of an example wireless communication system that applies security keys within an activation time using dummy protocol data units.

Now referring to FIG. 5, illustrated is a wireless communication system 500 that facilitates handling security activation for non-real-time services. The wireless communications system 500 can comprise a device 502 that communicates with a source access point 504, which can transmit security keys and/or parameters to receive the security keys as described. As this configuration depicts non-real-time services, timers based on packet sequence numbering are typically not utilized since the packet sequencing is less predictable, thus the security key change within an activation time cannot be ensured. In this regard, the device 502 and/or source access point 504 can transmit dummy protocol data units (PDU) to keep a substantially active packet sequence number; thus, the security activation time can be reached, as described previously, in this example.

Figure 6:
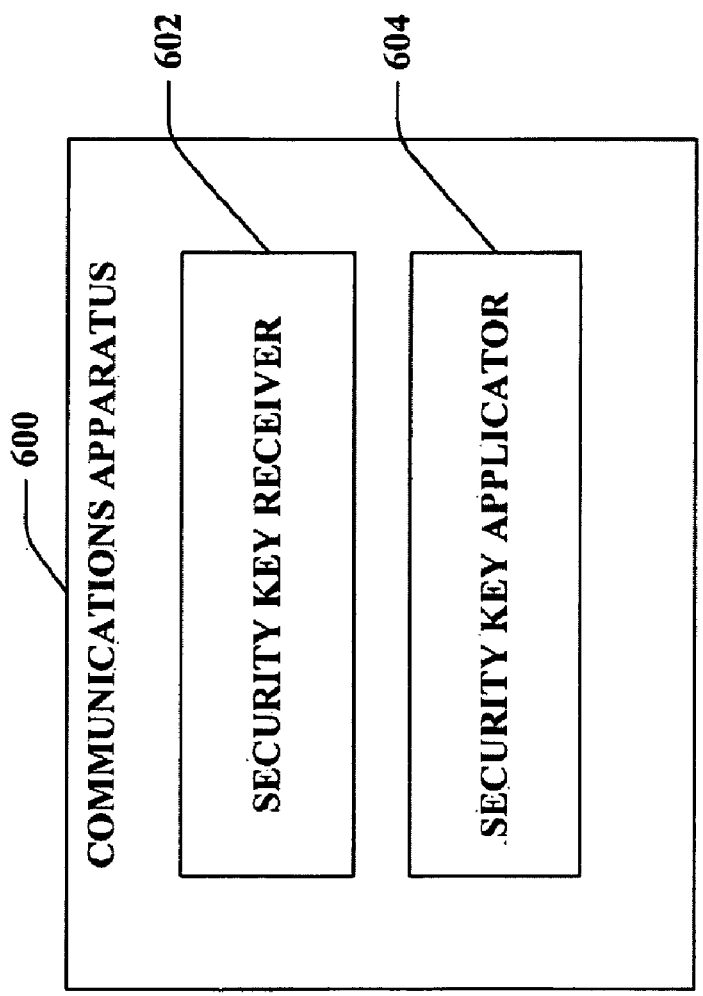
FIG. 6 is an illustration of an example communications apparatus for employment within a wireless communications environment.

Referring now to FIG. 6, illustrated is a communications apparatus 600 for employment within a wireless communications environment. The communications apparatus 600 can be a base station or a portion thereof, a mobile device or a portion thereof, or substantially any communications apparatus that receives data transmitted in a wireless communications environment. The communications apparatus 600 can include a security key receiver 602 that can receive one or more security keys and/or parameters required to derive one or more security keys from a core network component (e.g., via another transmitting device) and a security key applicator 604 that can take the security keys into use by applying the keys to subsequent wireless communications.

In one example, as described, the security key receiver 602 can receive one or more security keys and/or parameters required to derive one or more security keys from an access point; the keys can originate from a core wireless network component, such as an AAA server, that can subsequently authenticate data sent from the communications apparatus 600. In this regard, the security key applicator 604 can be utilized to apply the security keys to subsequent communication data to facilitate such authentication. The security keys can have specified security activation and expiration times. As described supra, the security key applicator 604 can take the keys into use in a variety of ways while adhering to the times. For example, where handover is initiated before the security activation time is reached, the security key applicator 604 can set a handover activation time subsequent to the security activation time. In this way, handover can be put off until security activation has completed. Thus, the new keys can be applied before handover to ensure the keys are current upon handing over communications. In one example, as described, the security key applicator 604 can utilize a packet sequence number count as a timer in real-time services. In a non-real-time context, the communications apparatus 600 can transmit dummy PDUs to keep a more accurate packet sequence numbering for utilizing a timer.

In another example, after the security key receiver 602 receives the security keys, new keys can be; transmitted in a subsequent handover command. These can be sent to immediately apply the first keys sent or derived initially, for example. The security key applicator 604 can associate the keys sent in the handover command with a target access point, as described, while holding the first keys in case of communication with the source access point. For example, the security key applicator 604 can apply the keys transmitted in the handover command, and transmit a random access preamble. If the handover fails, the security key applicator 604 can apply the first set of keys for further communication with the source access point. Additionally, in a non-real-time services example, upon receiving a security mode command, the communications apparatus 600 can re-establish and suspend relevant radio bearers after transmitting a security complete message. Upon transmitting, this message a wireless network can assume the communications apparatus 600 has taken the keys into use. The communications apparatus 600 can subsequently receive a confirmation of security mode complete message receipt and resume radio bearers at that time.

In yet another example, after the security key receiver 602 receives the security keys, second keys, or instructions to derive such, can be transmitted in a subsequent handover command. These can be sent to cancel the first keys sent initially, for example. The security key applicator 604 can associate the second keys sent in the handover command with a target access point, as described, while holding the first keys in case of communication with the source access point. For example, the security key applicator 604 can apply the second keys transmitted in the handover command, and transmit a random access preamble. If the handover fails, the security key applicator 604 can apply the first keys, for further communication with the source access point. Moreover, if the security activation time expires, the security key applicator 604 can apply the first keys.

Figure 7:
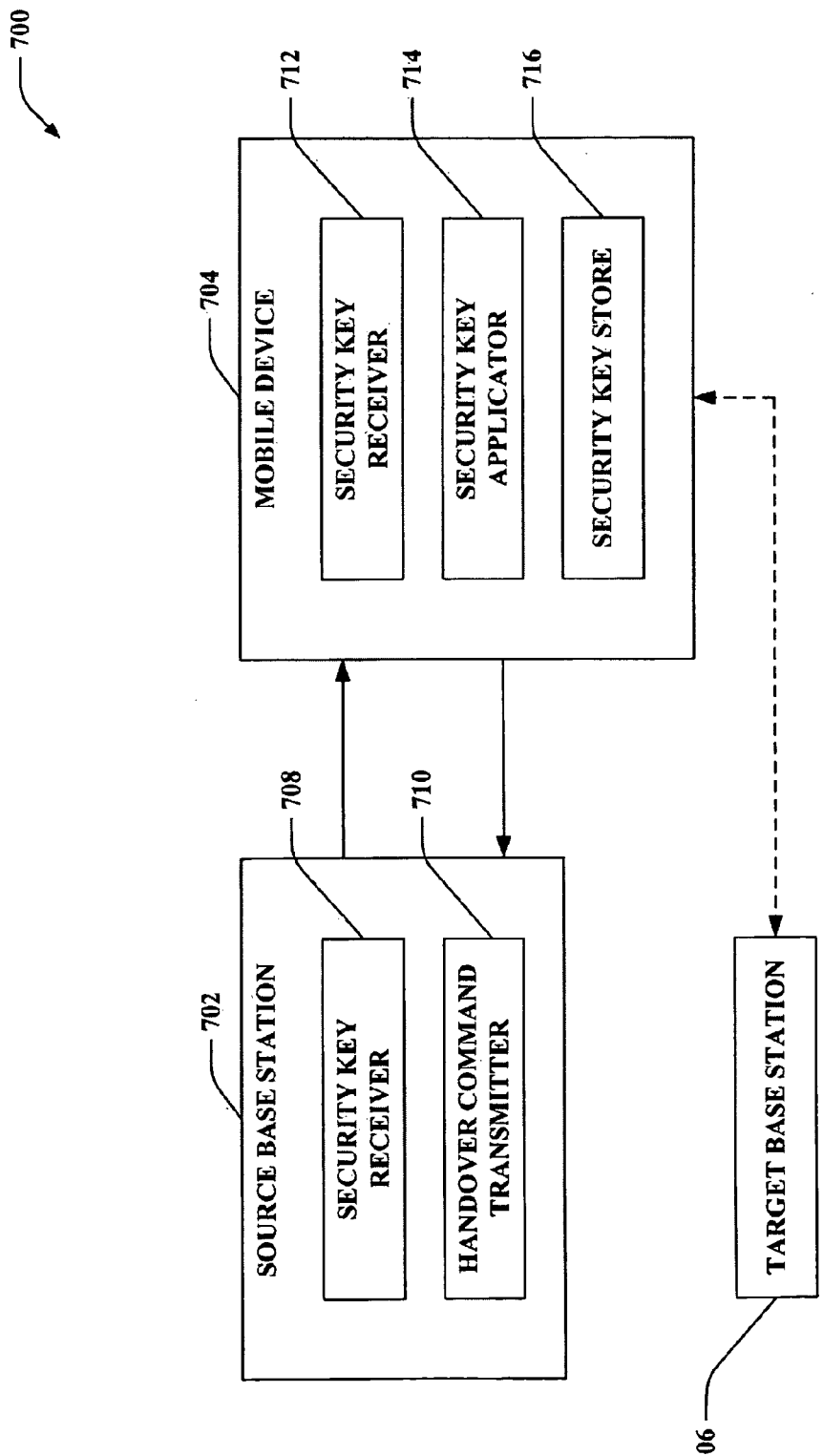
FIG. 7 is an illustration of an example wireless communications system that effectuates handing over communications while providing security activation.

Now referring to FIG. 7, illustrated is a wireless communications system 700 that facilitates security key management in communications handover. The system 700 includes a source base station 702 that communicates with a mobile device 704 (and/or any number of disparate mobile devices (not shown)), as well as a target base station 706 that can begin communicating with the mobile device 704. The base stations 702 and 706 can transmit information to mobile device 704 over a forward link or downlink channel; further base stations 702 and 706 can receive information from mobile device 704 over a reverse link or uplink channel. Moreover, system 700 can be a MIMO system. Also, the components and functionalities shown and described below in the source base station 702 can be present in the mobile device 704 and/or target base station 706 as well and vice versa, in one example; the configuration depicted excludes these components for ease of explanation.

Source base station 702 includes a security key receiver 708 that receives security keys and/or parameters required to derive security keys for a mobile device from a core network component (not shown) and a handover command transmitter 710 that can facilitate handing over communications to the target base station 706. In one example, the security key receiver 708 can receive security keys and/or parameters required to derive security keys and transmit the keys to the mobile device 704 for utilization in authenticating communication at the core network level. In another example, the keys (or a new set of keys) and/or parameters required to derive keys can be transmitted in a handover command message generated and sent by the handover command transmitter 710.

Mobile device 704 includes a security key receiver 712 that can receive security keys and/or parameters required to derive security keys from base stations for use in authenticating communications being transmitted to the wireless network, a security key applicator 714 that can take the keys into use as described, and a security key store 716 that can hold keys for use with one or more previously or subsequently accessed base stations. In one example, the security key receiver 712 can receive keys and/or parameters required to derive keys from the source base station 702, apply the keys using the security key applicator 714, and store the keys in the security key store 716.

According to an example, after keys and/or parameters required to derive keys are initially transmitted to the mobile device 704, a handover command can be generated and sent to the mobile device 704 by the handover command transmitter 710. This can result from a handover request as the mobile device hears in proximity to the target base station 706, for example. This can occur during security activation time for real-time services as described, and the security key applicator 714 can set a handover activation time to occur subsequent to the security activation time. Once the security activation has completed and the security key applicator 714 has taken the keys into use, communications can be handed over to the target base station 706.

In another example, the security key receiver 708 can receive new keys and/or parameters required to derive keys to be transmitted with a handover command message. The handover command transmitter 710 can generate the message with the keys and/or parameters required to derive keys and send the message to the mobile device 704. The security receiver 712 of the mobile device 704 can receive the handover command and keys and/or parameters required to derive keys and can store the keys in the security key store 716 along with the previous keys. The security key applicator 714 can apply the new keys to messages transmitted to the target base station 706 while utilizing the previous keys for authenticating communications with the source base station 702. Thus, while trying to initiate handover with the target base station 706 (e.g., transmitting a random access preamble), the security key applicator 714 can utilize the keys transmitted in the handover message. If, however, handover fails, the security key applicator 714 can utilize the previous keys stored in the security key store 716 to communicate with the source base station.

Referring to FIGS. 8-11, methodologies relating to activating security in real-time and non-real-time wireless network configurations are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 8:
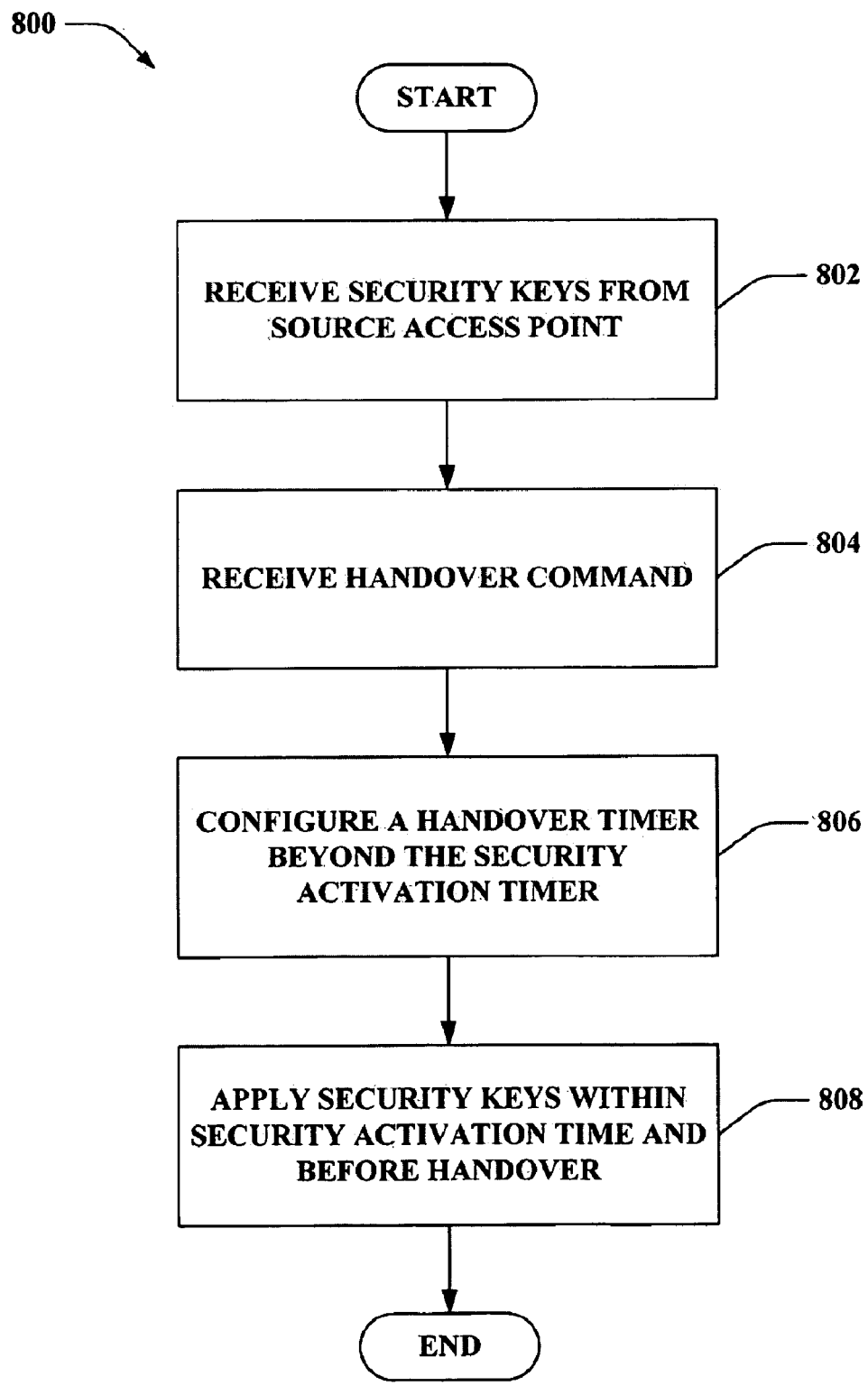
FIG. 8 is an illustration of an example methodology that facilitates activating security keys before communication handover.

Turning to FIG. 8, a methodology 800 that facilitates activating security keys while initiating and completing handover is displayed. At 802, security keys and/or parameters required to derive security keys are received from a source access point. The keys, as described, can be utilized to authenticate communications to the access point (or core wireless network components via the access points). In addition, the keys can be associated with security activation and expiration times. The activation time refers to the time by which the keys must be utilized. At 804, a handover command is received to request handover of communications from one access point to another. Handover can disrupt the security key activation process if not handled carefully as described herein; thus, at 806, a handover timer can be configured beyond the security activation timer. In this regard, security can be applied before handover as the handover has a longer time period within which to complete. To this end, at 808, the security keys can be applied within the security activation time and before handover. Thus, the security keys can be configured before handover to ensure proper functionality following handover.

Figure 9:
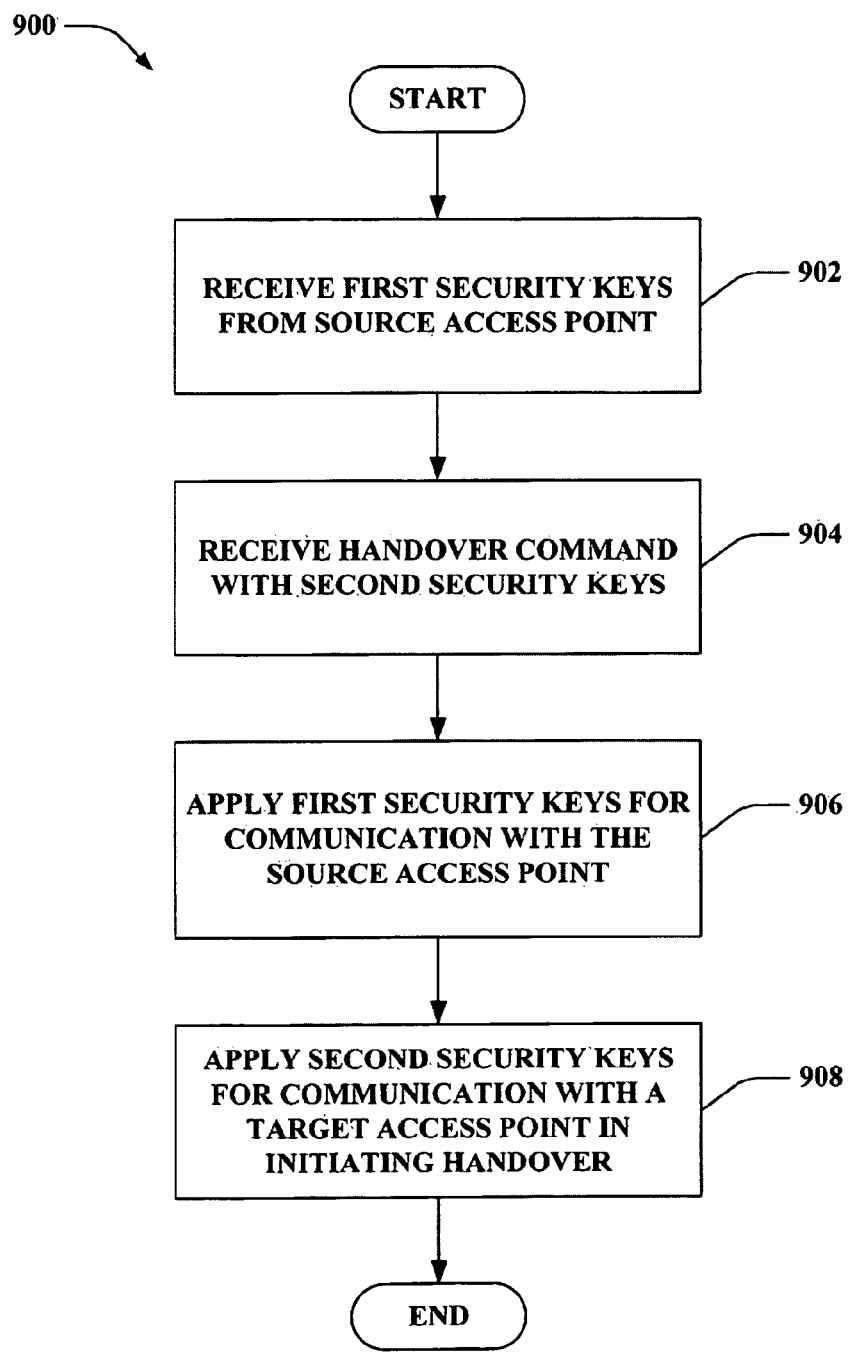
FIG. 9 is an illustration of an example methodology that facilitates activating security keys for handover.

Turning to FIG. 9, illustrated is another methodology 900 that facilitates activating security keys while initiating and completing handover. At 902, first security keys and/or parameters required to derive security keys are received from a source access point. As described, the keys can be utilized to authenticate subsequent communications and can have associated security activation times and expiration times. At 904, a handover command is received comprising second security keys. The second security keys can be meant to immediately apply the first keys for communicating with the source access point or to be utilized in communicating with a target access point associated with the handover, for example. At 906, the first security keys are applied for communicating with the source access point. This can facilitate communication with the source while waiting for handover to occur and/or upon handover failure; thus, these keys can be held until the handover is completed. At 908, the second security keys are applied for communication with the target access point in initiating handover and thereafter. Thus, a random access preamble, for example, can be transmitted to the target access point using the second security keys. In this regard, security activation is facilitated during handover of communications.

Figure 10:
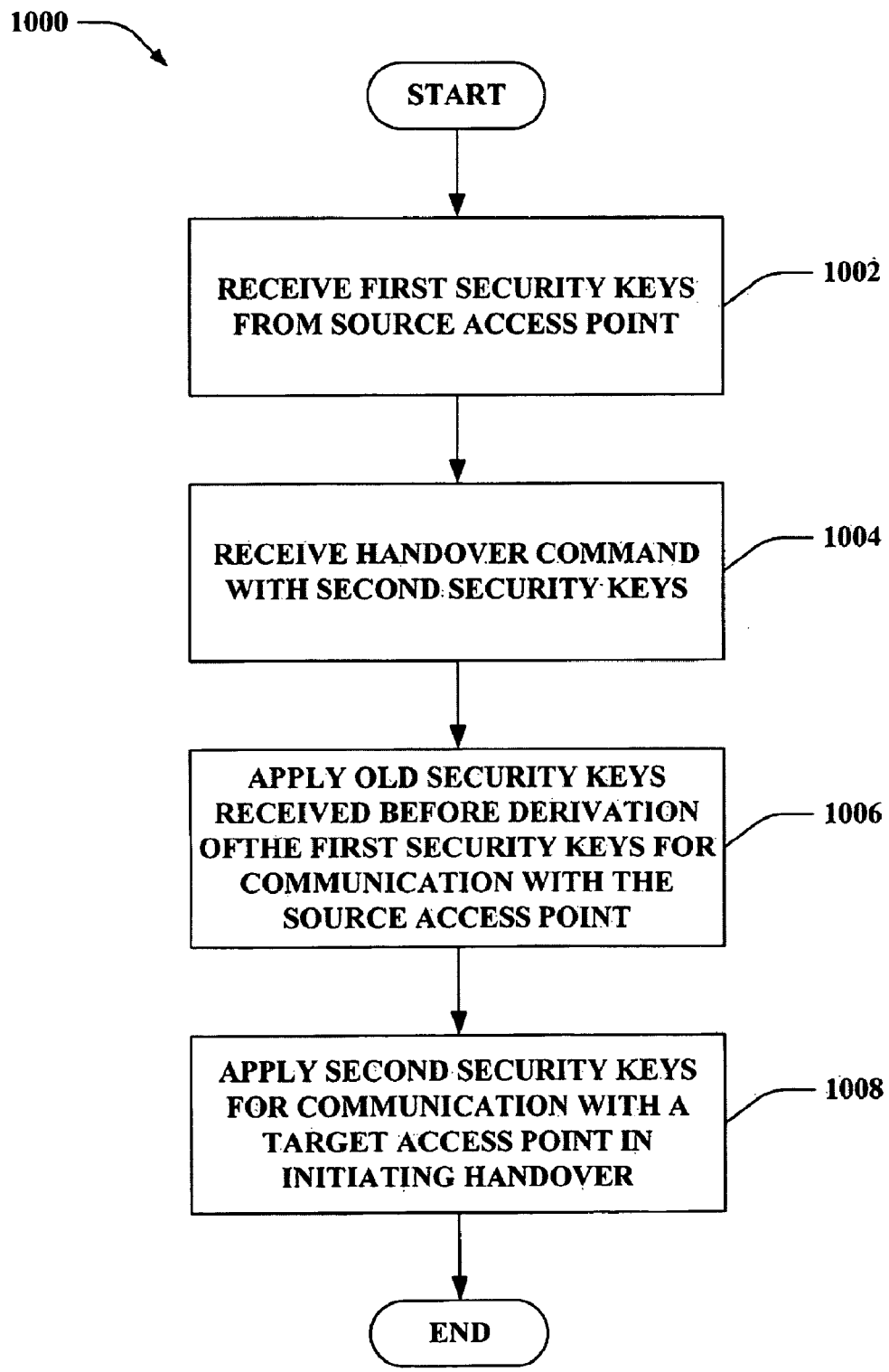
FIG. 10 is an illustration of an example methodology that facilitates cancelling old security keys.

Turning to FIG. 10, illustrated is another methodology 1000 that facilitates activating security keys while initiating and completing handover. At 1002, first security keys or parameters required to derive security keys are received from a source access point. As described, the keys can be utilized to authenticate subsequent communications and can have associated security activation times and expiration times. At 1004, a handover command is received comprising second security keys. The second security keys can be meant to cancel out the first keys or to be utilized in communicating with a target access point associated with the handover, for example. At 1006, the old keys used before the derivation of the first security keys are applied for communicating with the source access point. This can facilitate communication with the source while waiting for handover to occur and/or upon handover failure; thus, these keys can be held until the handover is completed. At 1008, the second security keys are applied for communication with the target access point in initiating handover and thereafter. Thus, a random access preamble, for example, can be transmitted to the target access point using the second security keys. In this regard, security activation is facilitated during handover of communications.

Figure 11:
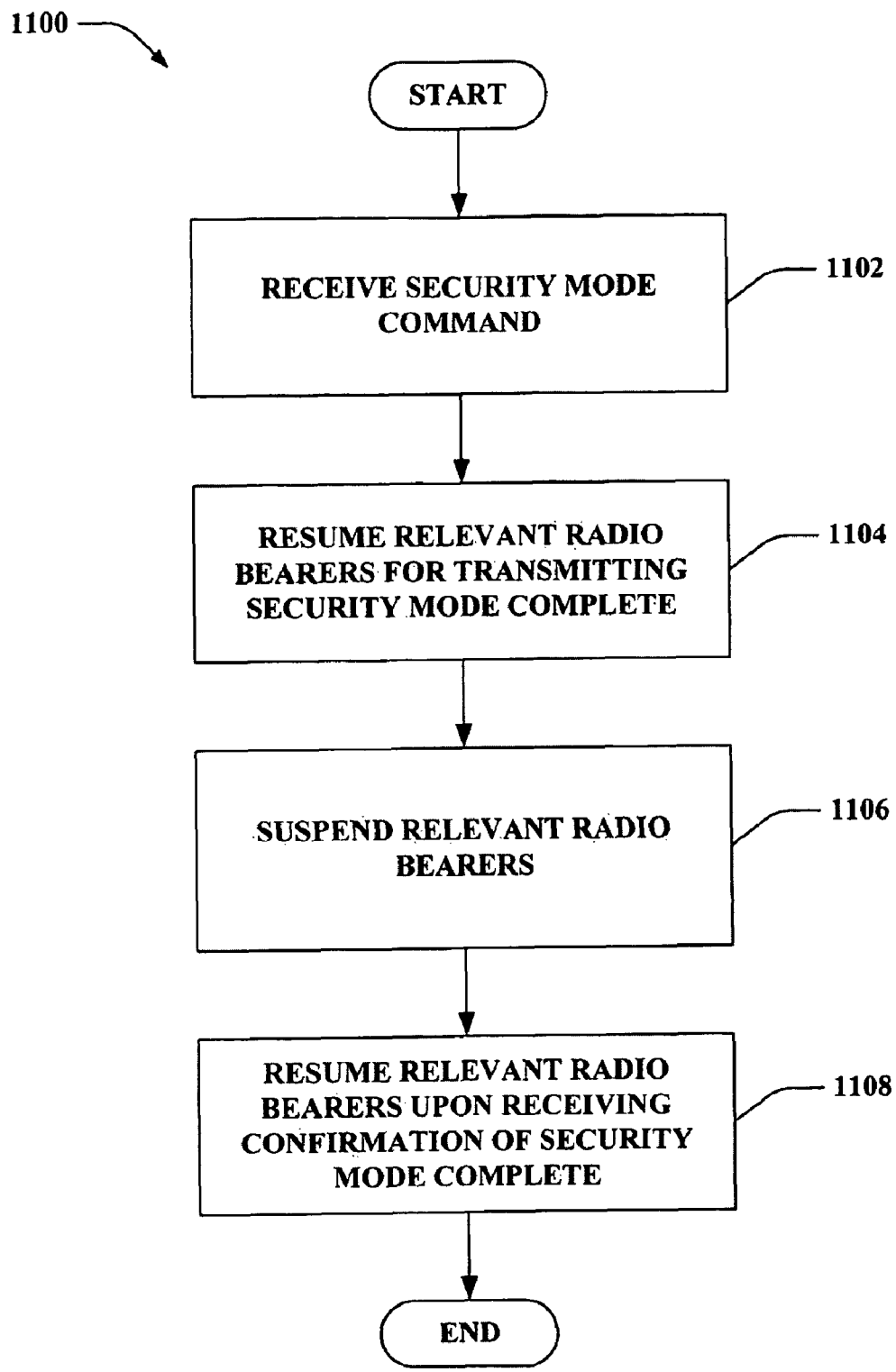
FIG. 11 is an illustration of an example methodology that facilitates activating security keys for non-real-time wireless communications.

Referring now to FIG. 11, illustrated is a methodology 1100 that facilitates providing security activation for non-real-time services. At 1102, a security mode command is received comprising one or more security keys and/or parameters required to derive one or more security keys to be utilized in authenticating subsequent communications. At 1104, relevant radio bearers can be used for transmitting a security mode complete message. At 1106, relevant radio bearers can be suspended to avoid further utilization of the old security configuration. Since non-real-time services cannot ensure timer accuracy (without taking additional action, such as transmitting dummy PDUs as described herein) due to lack of consistent packet sequence numbering, it can be uncertain whether the security mode is completed within the allotted security activation time. Thus, at 1108, relevant radio bearers are resumed only upon receiving a confirmation of security more complete. Thus, security activation can occur in non-real-time wireless communications configurations.

It will be appreciated that, in accordance with one or more aspects described herein, inferences can be made regarding ensuring security activation time is reached before handover completes and in non-real-time contexts as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
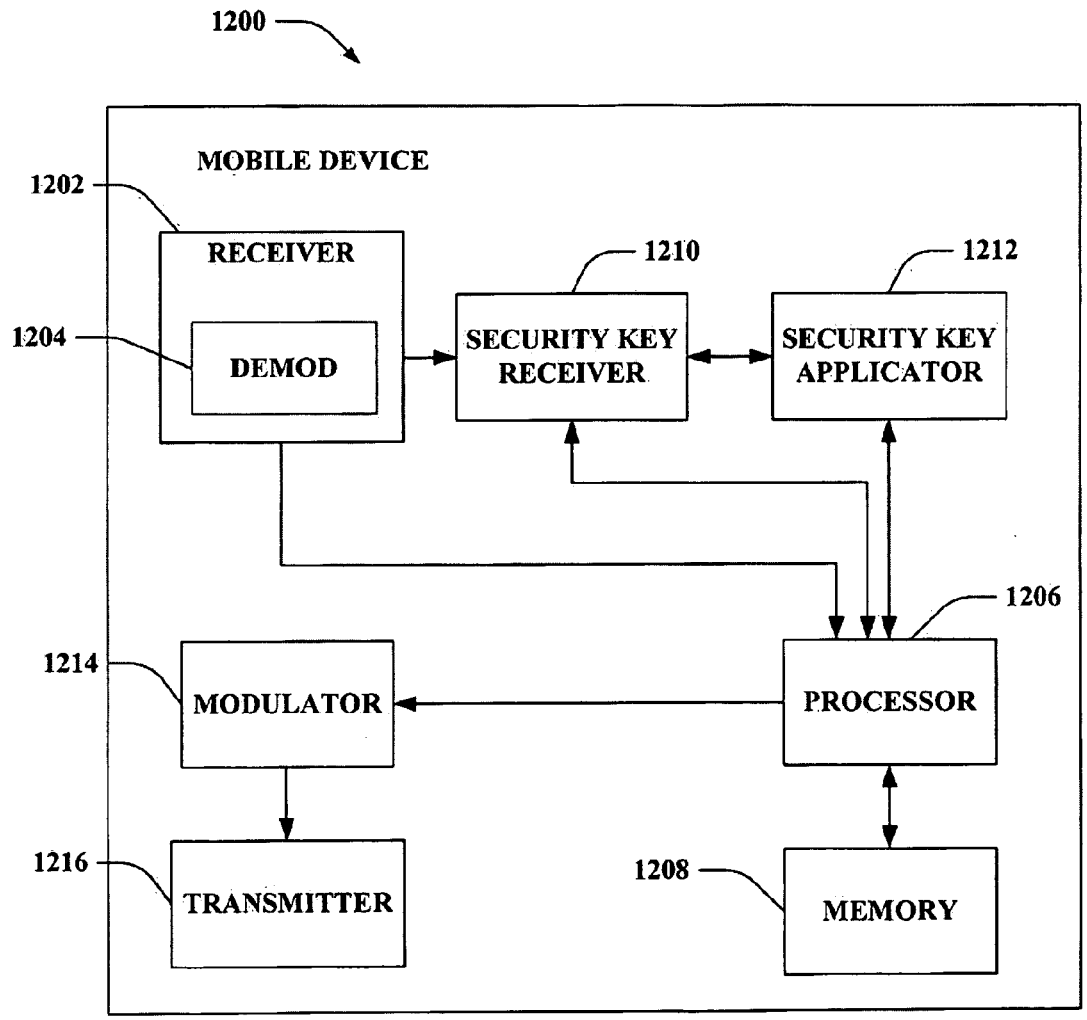
FIG. 12 is an illustration of an example mobile device that facilitates applying security keys in handing over communications.

FIG. 12 is an illustration of a mobile device 1200 that facilitates security key activation in wireless communications networks. Mobile device 1200 comprises a receiver 1202 that, receives a signal from, for instance, a receive antenna (not shown), performs typical actions on, (e.g., filters, amplifies, downconverts, etc.) the received signal, and digitizes the conditioned signal to obtain samples. Receiver 1202 can comprise a demodulator 1204 that can demodulate received symbols and provide them to a processor 1206 for channel estimation. Processor 1206 can be a processor dedicated to analyzing information received by receiver 1202 and/or generating information for transmission by a transmitter 1216, a processor that controls one or more components of mobile device 1200, and/or a processor that both analyzes information received by receiver 1202, generates information for transmission by transmitter 1216, and controls one or more components of mobile device 1200.

Mobile device 1200 can additionally comprise memory 1208 that is operatively coupled to processor 1206 and that can store data to be transmitted, received data, information related to available channels, data associated with analyzed signal and/or interference strength, information related to an assigned channel, power, rate, or the like, and any other suitable information for estimating a channel and communicating via the channel. Memory 1208 can additionally store protocols and/or algorithms associated with estimating and/or utilizing a channel (e.g., performance based, capacity based, etc.).

It will be appreciated that the data store (e.g., memory 1208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1208 of the subject systems and methods is intended to comprise, without being limited to, these and any other suitable types of memory.

Processor 1206 and/or receiver 1202 can further be operatively coupled to a security key receiver 1210 that can receive brie or more security keys from a core wireless network component (via base station, for example) to utilize in authenticating subsequent communications with the wireless network. In addition, the processor 1206 can be operatively coupled to a security key applicator 1212 that can apply the received security keys as described above. More specifically, in the case of impending handover for a mobile device 1200 in a real-time configuration, the security key applicator 1212 can set an activation timer to: expire subsequent to the security activation timer to ensure that security activation occurs before handover. In another example, the security key applicator 1212 can associate received keys with a source access point and keys from a handover command message with a target access point as described. In addition, the security key applicator 1212 can accommodate non-real-time configurations by transmitting dummy packets to keep a packet sequence number counter and/or suspending/resuming relevant radio bearers according to a verification procedure (e.g., L2-ACK, 3-way handshake, and/or the like) as described. Mobile device 1200 still further comprises a modulator 1214 and transmitter 1216 that respectively modulate and transmit signal to, for instance, a base station, another mobile device, etc. Although depicted as being separate from the processor 1206, it is to be appreciated that the security key receiver 1210, security key applicator 1212, demodulator 1204, and/or modulator 1214 can be part of the processor 1206 or multiple processors (not shown).

Figure 13:
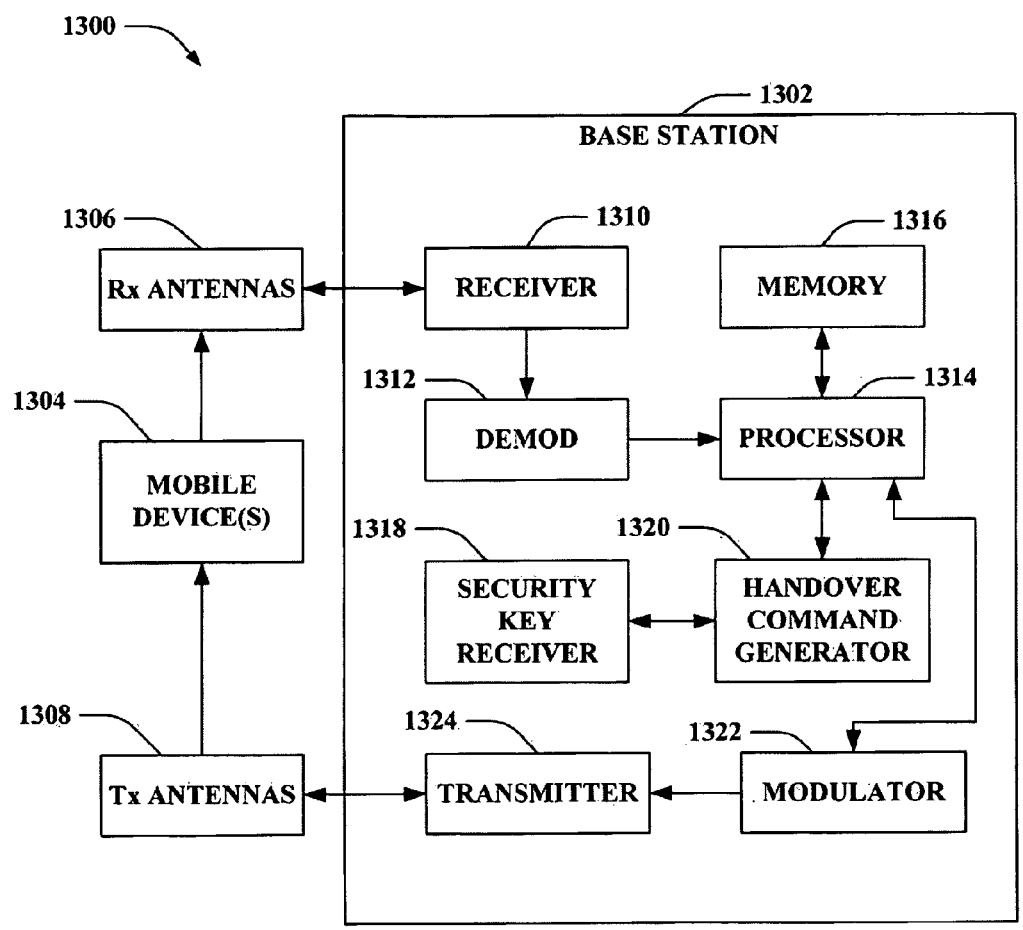
FIG. 13 is an illustration of an example system that facilitates transmitting handover command messages with security keys.

FIG. 13 is an illustration of a system 1300 that facilitates transmitting security keys utilized in handover and/or instructions to derive such keys. The system 1300 comprises a base station 1302 (e.g., access point, . . . ) with a receiver 1310 that receives signal(s) from one or more mobile devices 1304 through a plurality of receive antennas 1306, and a transmitter 1324 that transmits to the one or more mobile devices 1304 through a transmit antenna 1308. Receiver 1310 can receive information from receive antennas 1306 and is operatively associated with a demodulator 1312 that demodulates received information. Demodulated symbols are analyzed by a processor 1314 that can be similar to the processor described above with regard to FIG. 12, and which is coupled to a memory 1316 that stores information related to estimating a signal (e.g., pilot) strength and/or interference strength, data to be transmitted to or received from mobile device(s) 1304 (or a disparate base station (not shown)), and/or any other suitable information related to performing the various actions and functions set forth herein. Processor 1314 is further coupled to a security key receiver 1318 that receives security keys and/or parameters used to derive security keys from a core wireless network component and a handover command generator 1320 that can generate a handover command to a target base station according to the received keys and/or parameters used to derive the keys.

According to an example, the security key receiver 1318 can receive security keys and/or parameters used to derive security keys from a core wireless network component (not shown) for one or more mobile devices 1304. The base station 1302 can transmit the keys and/or the parameters used to derive keys to the mobile devices 1304 for subsequent utilization. Additionally, the security key receiver 1318 can receive new keys and/or parameters used to derive new keys to be applied for handing over communications as described. The handover command generator 1320 can create a handover command comprising the new keys and/or parameters used to derive the new keys and transmit the command to one or more mobile devices 1304 via the transmitter 1324, for example. Furthermore, although depicted as being separate from the processor 1314, it is to be appreciated that the security key receiver 1318, handover command generator 1320, demodulator 1312, and/or modulator 1322 can be part of the processor 1314 or multiple processors (not shown).

Figure 14:
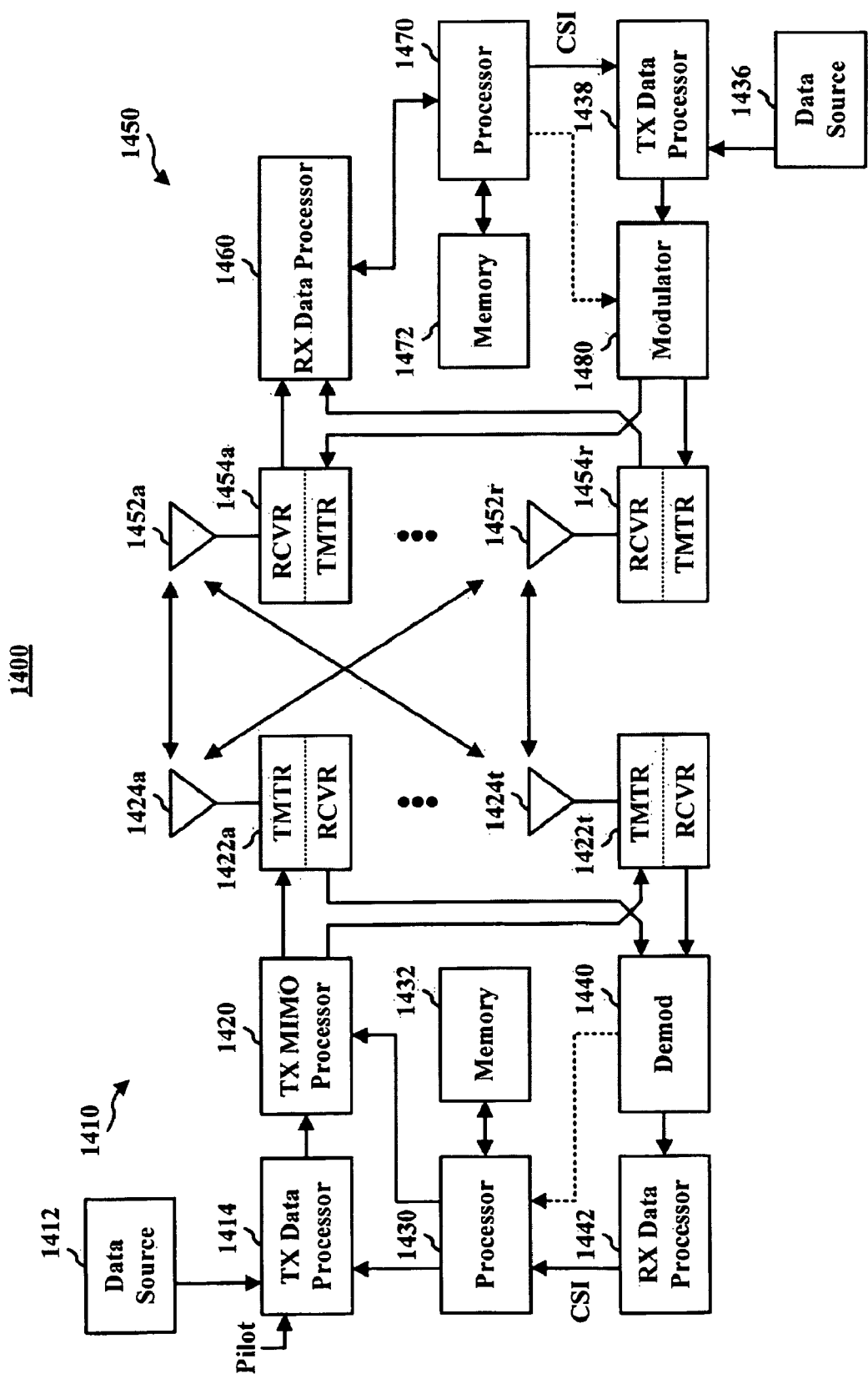
FIG. 14 is an illustration of an example wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 can include more than one base station and/or more than one mobile device, wherein additional base stations and/or mobile devices can be substantially similar or different from example base station 1410 and mobile device 1450 described below. In addition, it is to be appreciated that base station 1410 and/or mobile device 1450 can employ the systems (FIGS. 1-7 and 12-13) and/or methods (FIGS. 8-11) described herein to facilitate wireless communication there between.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (GDM). The pilot data is typically a known data pattern that is processed in a known manner and can be used at mobile device 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At mobile device 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and down-converts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which precoding matrix to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 can process the extracted message to determine which precoding matrix to use for determining the beamforming weights.

Processors 1430 and 1470 can direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they Can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it Can be communicatively coupled to the processor via various means as is known in the art.

Figure 15:
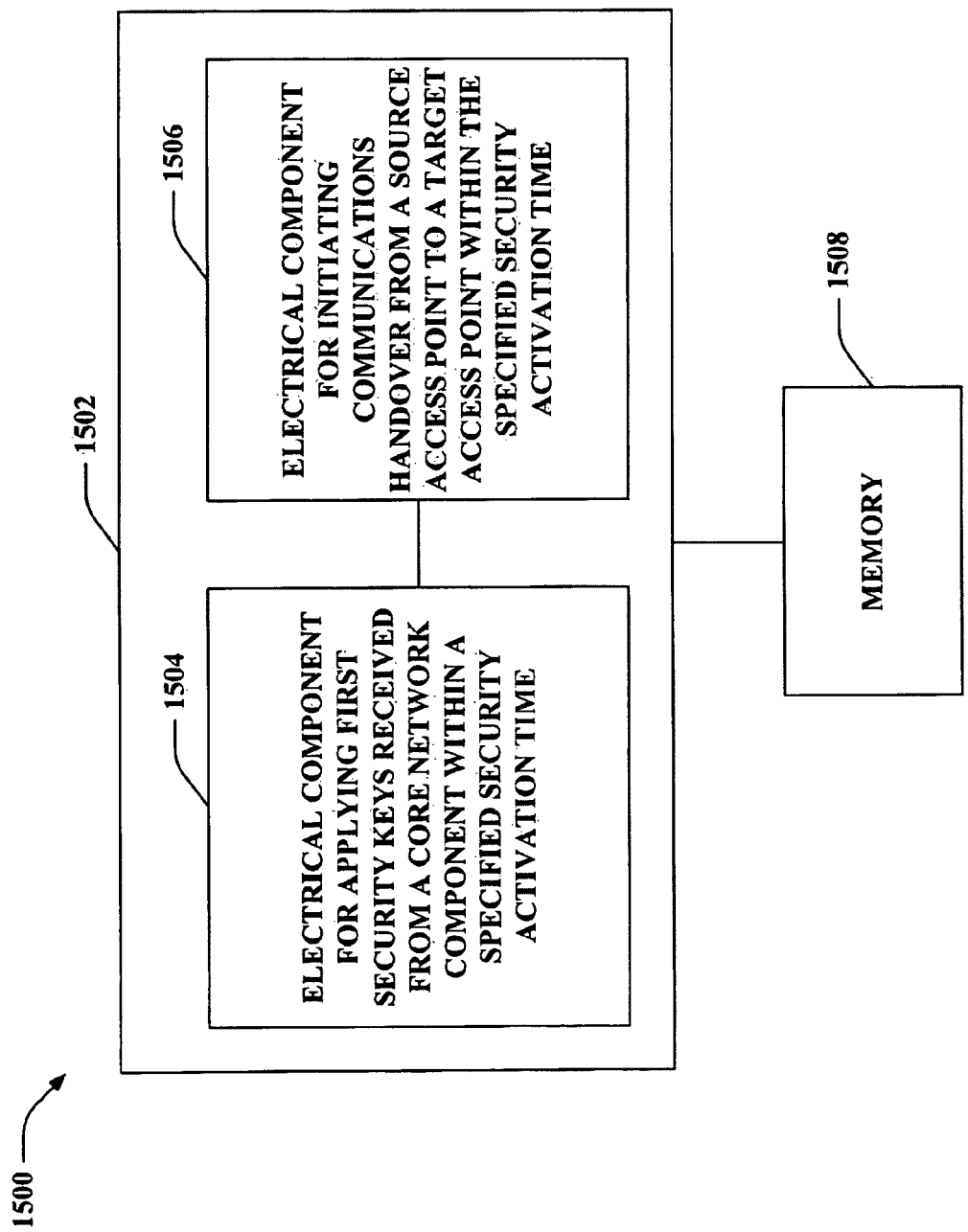
FIG. 15 is an illustration of an example system that applies security keys while initiating handover.

With reference to FIG. 15, illustrated is a system 1500 that activates security keys for authenticating communications in wireless networks. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for applying first security keys within a specified security activation time 1504. For example, as described, security keys can be received or derived for application to subsequent communication to ensure authenticity thereof. The keys can be associated with a timer indicating a time period for application of the keys. Further, logical grouping 1502 can comprise an electrical component for initiating communications handover from a source access point to a target access point within the specified security activation time 1506. For example, the security keys can be applied before handover Occurs though handover is initiated during the security activation time. In this regard, a handover, time can be set subsequent to the end of the security activation time to ensure security activation completes before handover. In another example, new keys can be received in a handover message and can be utilized to initiate the handover while using the original keys to communicate with the source access point as described. Additionally, system 1500 can include a memory 1508 that retains instructions for executing functions associated with electrical components 1504 and 1506. While shown as being external to memory 1508, it is to be understood that one or more of electrical components 1504 and 1506 can exist within memory 1508.

Figure 16:
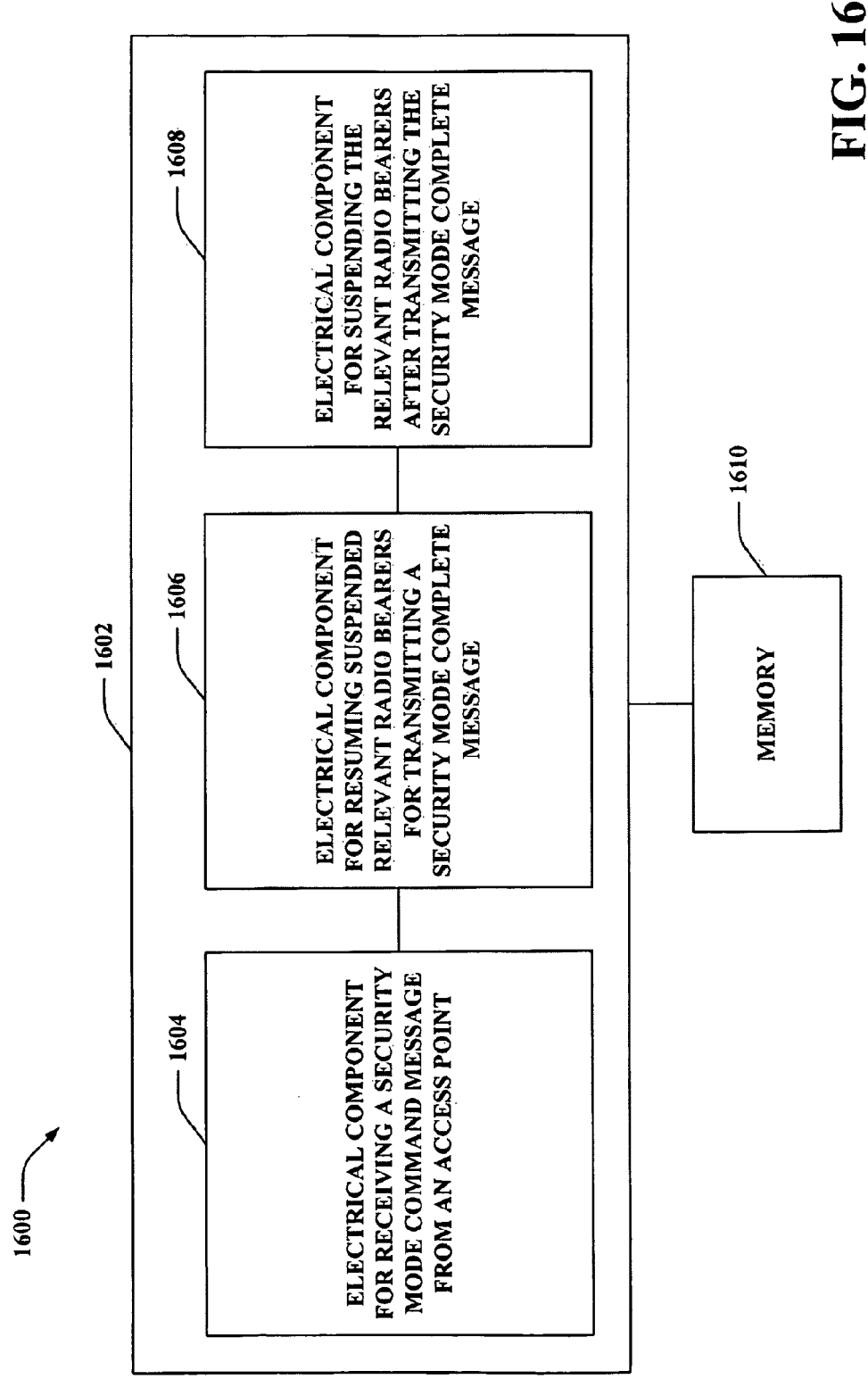
FIG. 16 is an illustration of an example system that applies security keys for non-real-time wireless communications.

Turning to FIG. 16, illustrated is a system 1600 that facilitates security activation, within an activation time period, for non-real-time services. System 1600 can reside within a base station, mobile device, etc., for instance. As depicted, system 1600 includes functional blocks that can represent functions implemented by a processor, software, or combination thereof (e.g., firmware). System 1600 includes a logical grouping 1602 of electrical components that facilitate activating security. Logical grouping 1602 can include an electrical component for receiving a security mode command message from an access point 1604. The security mode command message can comprise security keys or parameters required to derive security keys to utilize in authenticating subsequent communication with the wireless network. Moreover, logical grouping 1602 can include an electrical component for resuming suspended relevant radio bearers for transmitting a security mode complete message 1606. Thus, the radio bearers required to transmit such messages can be resumed for that purpose and suspended subsequently. To this end, logical grouping 1602 further includes an electrical component for suspending the relevant radio bearers after transmitting the security mode complete message 1608. Because non-real-time services lack a consistent packet sequence number, it can be difficult to utilize a timer as described. Thus, in one example, the relevant radio bearers are suspended since it is unknown whether the security complete message was transmitted within the activation period. Therefore, the radio bearers can be suspended until a confirmation is received for the security mode complete message as described. Additionally, system 1600 can include a memory 1610 that retains instructions for executing functions associated with electrical components 1604, 1606, and 1608. While shown as being external to memory 1610, it is to be understood that electrical components 1604, 1606, and 1608 can exist within memory 1610.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for activating security keys in wireless communications networks, comprising:
    deriving first security keys from a core network component associated with a security activation time by which the security keys are to be applied, wherein the security activation time is based at least in part on packet sequence numbers;
    applying the first security keys within the security activation time; and
    handing over communications from a source access point to a target access point within the security activation time after applying the first security keys.

2. The method of claim 1, further comprising configuring a handover activation time having an expiration before the security activation time, the handing over communications occurs within the handover activation time.

3. The method of claim 1, further comprising receiving a handover command message comprising second security keys.

4. The method of claim 3, wherein the second security keys indicate cancellation of the first security keys in favor of security keys received before the first security keys.

5. The method of claim 3, further comprising applying the second security keys for communication with the target access point.

6. The method of claim 5, further comprising storing the first keys for subsequent communication with the source access point.

7. The method of claim 1, further comprising transmitting dummy protocol data units to create packet sequence numbers for non-real-time services.

8. A wireless communications apparatus, comprising:
    at least one processor configured to:
        apply a first set of security keys determined from a source access point having a specified security activation time, wherein the security activation time is based at least in part on packet sequence numbers; and
        complete handover of communications from the source access point to a target access point within the security activation time; and
    a memory coupled to the at least one processor.

9. The wireless communications apparatus of claim 8, wherein the at least one processor is further configured to set a handover activation time expiring subsequent to the security activation time, the handing over communications is completed within the handover activation time.

10. The wireless communications apparatus of claim 8, wherein the at least one processor is further configured to receive a handover command message comprising a second set of security keys.

11. The wireless communications apparatus of claim 10, wherein the second set of security keys are in the handover command message to cancel the first set of security keys in favor of a set of security keys earlier derived.

12. The wireless communications apparatus of claim 10, wherein the at least one processor is further configured to apply the second set of security keys for communication with the target access point.

13. The wireless communications apparatus of claim 12, wherein the first set of keys are stored for subsequent communication with the source access point.

14. The wireless communications apparatus of claim 8, wherein the at least on processor is further configured to transmit dummy protocol data units to create consistent packet sequence numbers.

15. A wireless communications apparatus that activates security keys in wireless communications networks, comprising:
means for applying first security keys within a specified security activation time, wherein the security activation time is based at least in part on packet sequence numbers; and
means for initiating communications handover from a source access point to a target access point within the specified security activation time.

16. The wireless communications apparatus of claim 15, further comprising means for configuring a handover activation time having an expiration time before the security activation time.

17. The wireless communications apparatus of claim 16, further comprising means for completing the handover within the handover activation time.

18. The wireless communications apparatus of claim 15, further comprising means for receiving a handover command message comprising second security keys.

19. The wireless communications apparatus of claim 18, further comprising means for applying the second security keys for communication with the target access point.

20. The wireless communications apparatus of claim 19, further comprising means for storing the first keys for subsequent communication with the source access point.

21. The wireless communications apparatus of claim 15, further comprising means for transmitting dummy protocol data units to create packet sequence numbers for non-real-time services.

22. A computer program product, comprising:
a computer-readable storage medium comprising:
code for causing at least one computer to receive first security keys from a core network component associated with a security activation time by which the security keys are to be applied, wherein the security activation time is based at least in part on packet sequence numbers;
code for causing the at least one computer to apply the first security keys within the security activation time; and
code for causing the at least one computer to handover communications from a source access point to a target access point within the security activation time after applying the first security keys.

23. The computer program product of claim 22, wherein the computer-readable storage medium further includes code for causing the at least one computer to configure a handover activation time having an expiration before the security activation time, the handing over communications occurs within the handover activation time.

24. The computer program product of claim 22, wherein the computer-readable storage medium further includes code for causing the at least one computer to receive a handover command message comprising second security keys.

25. The computer program product of claim 24, wherein the second security keys indicate cancellation of the first security keys in favor of security keys received before the first security keys.

26. The computer program product of claim 24, wherein the computer-readable storage medium further includes code for causing the at least one computer to apply the second security keys for communication with the target access point.

27. The computer program product of claim 26, wherein the computer-readable storage medium further includes code for causing the at least one computer to store the first keys for subsequent communication with the source access point.

28. The computer program product of claim 22, wherein the computer-readable storage medium further includes code for causing the at least one computer to transmit dummy protocol data units to create packet sequence numbers for non-real-time services.

* * * * *